United States Patent Office 3,414,608
Patented Dec. 3, 1968

3,414,608
PROCESS FOR THE MANUFACTURE OF BIS-(β-HYDROXYETHYL) TEREPHTHALATE
Yasuhiro Fujita, Ohtake-shi, Isao Nakamura, Yamaguchi-ken, and Junichi Hijii, Ohtake-shi, Japan, assignors to Mitsui Petrochemical Industries, Ltd., Chiyoda-ku, Tokyo, Japan, a corporation of Japan
No Drawing. Filed Apr. 30, 1965, Ser. No. 452,368
Claims priority, application Japan, May 15, 1964, 39/27,241, 39/27,242
6 Claims. (Cl. 260—475)

ABSTRACT OF THE DISCLOSURE

A process for the manufacture of bis-(β-hydroxyethyl) terephthalate by reacting terephthalic acid with ethylene oxide in the presence of a tertiary amine catalyst, characterized in that the reaction is carried out in an inert liquid solvent medium of halogenated hydrocarbon or alkyl esters of carboxylic acid esters such as chloroform, carbon tetrachloride, monochloroethane, dichloroethane, trichloroethane, tetrachloroethane, chlorobenzene, bromoform, bibromoethane, ethyl acetate, butyl acetate, methyl propionate, ethyl propionate, butyl propionate and ethyle benzoate. These compounds can be converted into polyethylene terephthalate useful for the production of fibers and films.

---

The present invention relates to a process for the manufacture of bis-(β-hydroxyethyl) terephthalate from terephthalic acid and ethylene oxide.

Bis-(β-hydroxyethyl) terephthalate can easily be converted into polyethylene terephthalate by heating.

The polyethylene terephthalate has generally been prepared by process comprising first the preparation of lower alkyl esters from terephthalic acid, and then the transesterification thereof with glycols, followed by polymerization. If bis-(β-hydroxyethyl) terephthalate is directly prepared from terephthalic acid and ethylene oxide and then the ester is polymerized to obtain polyethylene terephthalate subsequently, the preparing process may be considerably simplified, which will be highly useful to industry.

The object of the present invention is to manufacture bis-(β-hydroxyethyl) terephthalate which can be converted into polyethylene terephthalate useful for the production of fibres and films by heating.

Although there has been hitherto proposed a process wherein bis(β-hydroxyethyl) terephthalate is directly prepared from terephthalic acid and ethylene oxide in aqueous medium in the presence of basic catalysts the process has two gross disadvantages that ethylene oxide is wasted and the yield of the ester remains low. Furthermore, in order to overcome these disadvantages the reactions have been proposed to be carried out in organic liquid media in the presence of basic catalysts, where the media are, for example, those selected from the group of alcohols, ketones, mixtures thereof, ethers and alkylbenzenes.

However, alcohols react not only with impurities which are contained in raw material terephthalic acid, for example, formylbenzoic acid to contaminate reaction product, but also with ethylene oxide in the presence of basic catalysts to consume ethylene oxide, while ketones self-condense in the presence of the said catalysts. Therefore, alcohols and ketones are not preferable medium. On the other hand, ethers and alkylbenzenes dissolve only slightly the raw material terephthalic acid and the reaction product bis-(β-hydroxyethyl) terephthalate under the reaction conditions. Alcohols, ketones, ethers and alkyl benzenes are neither preferable media for preparing bis-(β-hydroxyethyl) terephthalate from terephthalic acid and ethylene oxide.

Thus, as the organic liquid media which can be used in the preparation of bis-(β-hydroxyethyl) terephthalate from terephthalic acid and ethylene oxide, it is necessary that the media dissolve significantly the formed bis-(β-hydroxyethyl) terephthalate as well as the raw material terephthalic acid and ethylene oxide under the reaction conditions and are inert for the reaction system and cannot be changed under the reaction conditions.

As the result of our study on such organic liquid media, we have now found that halogenated hydrocarbons and alkyl esters of organic carboxylic acids are effective as the organic liquid medium for the preparation of bis-(β-hydroxyethyl) terephthalate from terephthalic acid and ethylene oxide.

According to the present invention, therefore, we provide a process for the manufacture of bis-(β-hydroxyethyl) terephthalate from terephthalic acid and ethylene oxide which comprises reacting terephthalic acid with ethylene oxide in halogenated hydrocarbon or in alkyl ester of organic carboxylic acids in the presence of tertiary amine catalyst to bis-(β-hyroxyethyl) terephthalate.

The halogenated hydrocarbons and alkyl esters of organic carboxylic acids which may be used as the organic liquid medium in the process of the present invention are inert for terephthalic acid, impurities which are contained in the terephthalic acid and the formed bis-(β-hydroxyethyl) terephthalate and are substantially unchanged under the reaction conditions, and therefore, they are very preferable. Using the halogenated hydrocarbons and alkyl esters of organic carboxylic acids in the process of the present invention, the conversion ratio of terephthalic acid is more than 90%, the yield of bis-(β-hydroxyethyl) terephthalate amounts to 95% or more based upon terephthalic acid consumed. The substantial amount of the formed bis-(β-hydroxyethyl) terephthalate is crystallized out by hot-filtrating the reaction product mixture and cooling the filtrate to room temperature. The crystallized bis-(β-hydroxyethyl) terephthalate is isolated by filtration. The melt color of the isolated bis-(β-hydroxyethyl) terephthalate is less than 100 in number of Hazen color index. When the isolated bis-(β-hydroxyethyl) terephthalate is heated at the temperature of 170° C. for 5 hours, the color in number of Hazen color index does not change. By single recrystallization of the bis - (β-hydroxyethyl) terephthalate, the melt color decreases below 30 in Hazen, thus colorless polyethylene terephthalate can be obtained by head-polymerization.

The terephthalic acids which may be used for the process of the present invention are those which are obtained by air oxidation of p-xylene in liquid phase or oxidation of p-xylene with nitric acid or by isomerization or disproportation of alkali salts of benzene carboxylic acids, where halogenated hydrocarbons and esters of organic carboxylic acids are commonly used as solvent.

As examples of halogenated hydrocarbons which may be used as the organic liquid medium in the process of the present invention, there are mentioned chlorinated hydrocarbons such as chloroform, carbon tetrachloride, monochloroethane, dichloroethane, trichloroethane, tetrachloroethane, chlorobenzene; brominated hydrocarbons such as bromoform and dibromoethane; iodized hydrocarbons and fluorinated hydrocarbons.

As examples of alkyl esters of organic carboxylic acids which may be used as the organic liquid medium in the process of the present invention, there are mentioned propionate, butyl propionate and ethyl benzoate. The suitable quantity of solvents used is 1 to 20 parts by weight, preferably 2 to 15 parts by weight per 1 part by weight of terephthalic acid.

In the process of the present invention, tertiary amines may be used as a catalyst. The suitable tertiary amines are triethylamine, tripropylamine, pyridine and dimethylaniline, and aliphatic tertiary amines are especially preferable. The suitable quantity of the amines which are generally used is 0.1 to 10% by weight, preferably 0.5 to 5% by weight per 1 part by weight of terephthalic acid, but the quantity may be varied according to the reaction temperature.

The process of the present invention may be carried out by supplying ethylene oxide to reaction system under normal pressure in the gaseous state, but the reaction is preferably carried out by maintaining ethylene oxide in the liquid phase under 10 to 30 atmospheric pressure so that the reaction period may be considerably decreased. For applying the above pressure, inert gases may be used. In this case, the preferred quantity of ethylene oxide is 1.5 to 2.5 mols. and particularly preferable one is 1.7 to 2.2 mols. per 1 mol. of terephthalic acid. The reaction temperature which may be preferred in the process of the present invention is 60° to 170° C., especially 90° C. to 150° C.

The process of the present invention may be carried out batch wise and continuous wise.

The present invention is illustrated as follows but not limited by the following Examples.

Example 1

50 parts by weight of terephthalic acid (purity: 99.2%, content of formylbenzoic acid: 0.3%), 200 parts by weight of 1,1,2-trichloroethane, 1 part by weight of triethylamine and 27.8 parts by weight of liquid ethylene oxide were fed into an autoclave provided with an agitator. After air in the autoclave was replaced by nitrogen the autoclave was pressurized to 15 kg.%cm.$^2$ (gauge).

The reaction mixture was maintained at the temperature of 110° C. and reaction was carried out for 1.5 hours. After the reaction, the reaction product mixture was hot-filtrated to recover 0.5 part by weight of unchanged terephthalic acid. The filtrate was cooled to room temperature to crystallize out bis-($\beta$-hydroxyethyl) terephthalate crystals. The crystals were filtrated to obtain 69 parts by weight of bis-($\beta$-hydroxyethyl) terephthalate. The obtained filtrate can be reused as a reaction medium, but it may be also concentrated to recover bis-($\beta$-hydroxyethyl) terephthalate. The melting point and melt color of the obtained bis-($\beta$-hydroxyethyl) terephthalate were 109° C. and 65 in number of Hazen color index, respectively.

When the bis-($\beta$-hydroxyethyl) terephthalate was recrystallized from water, the melt color is 30 in Hazen. The recrystallized product was heated at the temperature of 280° C. under a reduced pressure of 0.4 mm. Hg in nitrogen atmosphere in the presence of antimony trioxide to obtain a colorless polyethylene terephthalate. The intrinsic viscosity was 0.65. The loss of trichloroethane in this reaction was not found as is the case with blank test.

Example 2

50 parts by weight of terephthalic acid (purity: 99.2%, content of formylbenzoic acid: 0.3%), 150 parts by weight of butyl acetate, 1 part by weight of tripropylamine and 27.8 parts by weight of liquid ethylene oxide were charged into an autoclave provided with an agitator. After air in the autoclave was purged with nitrogen the autoclave was pressurized to 15 kg./cm.$^2$ (gauge).

The reaction mixture was maintained at the temperature of 110° C. and the reaction was carried out for 2 hours. After the reaction, the reaction product mixture was hot-filtrated to recover 1 part by weight of unchanged terephthalic acid. The filtrate was cooled to crystallize out bis-($\beta$-hydroxyethyl) terephthalate crystals. The crystals were filtrated to obtain 67 parts by weight of bis-($\beta$-hydroxyethyl) terephthalate. The obtained filtrate can be reused as a reaction medium, but it may be concentrated to recover bis-($\beta$-hydroxyethyl) terephthalate. The melting point and melt color of the obtained bis-($\beta$-hydroxyethyl) terephthalate were 109° C. and 80 in Hazen, respectively. The product was heated to 170° C., but the color did not change. When the product was recrystallized from butyl acetate, the melt color was 80 in Hazen. The loss of butyl acetate in this reaction was not observed as is the case with blank test.

What we claim is:

1. A process for the manufacture of bis-($\beta$-hydroxyethyl) terephthalate from terephthalic acid and ethylene oxide which comprises reacting terephthalic acid with ethylene oxide in the presence as catalyst of a tertiary amine in an inert liquid medium selected from the group consisting of chloroform, carbon tetrachloride, monochloroethane, dichloroethane, trichloroethane, tetrachloroethane, chlorobenzene, bromoform, dibromoethane, ethyl acetate, butyl acetate, methyl propionate, ethyl propionate, butyl propionate and ethyl benzoate.

2. The process as claimed in claim 1 wherein the reaction is carried out at temperature between 60° and 170° C.

3. The process as claimed in claim 1 wherein the tertiary amine is selected from triethyl amine, tripropyl amine, dimethyl aniline and pyridine.

4. The process as claimed in claim 1 wherein the molar ratio of terephthalic acid to ethylene oxide is between 1:1.5–2.5.

5. The process as claimed in claim 1 wherein the ratio of terephthalic acid to solvents used is between 1 to 1–20, by weight.

6. The process as claimed in claim 1 wherein the quantity of the tertiary amines is between 0.001–0.1 times the weight of terephthalic acid.

References Cited

UNITED STATES PATENTS 2,932,662  4/1960  Ringwald _____ 260—475

JAMES A. PATTEN, *Primary Examiner.*

E. J. SKELLY, *Assistant Examiner.*